E. E. ARNOLD.
VEHICLE AXLE.
APPLICATION FILED MAY 4, 1912.
1,035,404.
Patented Aug. 13, 1912.
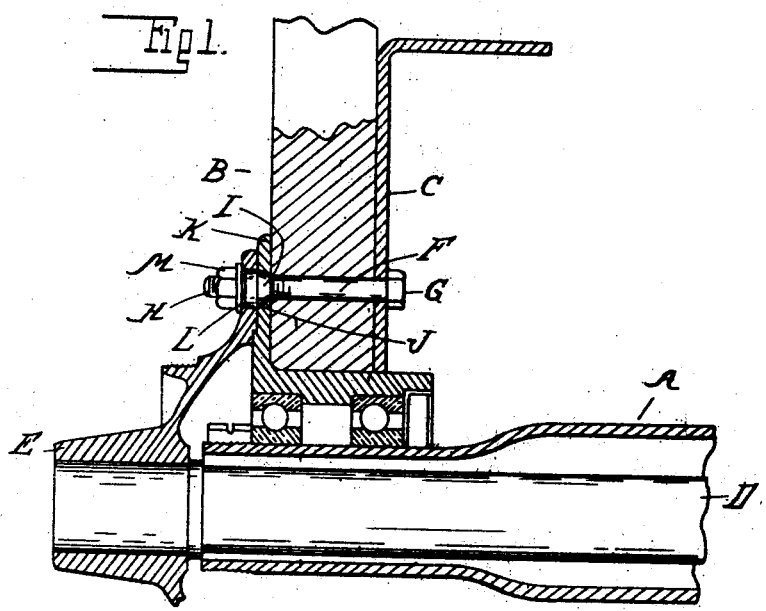
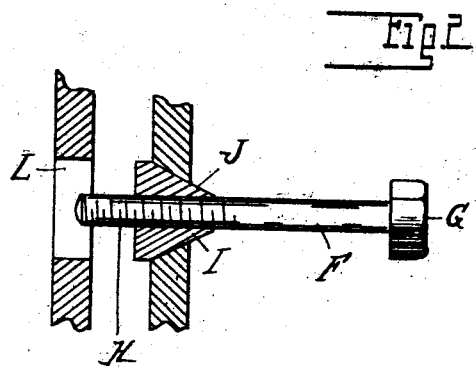
Witnesses
H. B. Ford
James P. Barry
Inventor
Edwin E. Arnold,
By Whitmore Hulbut Whitmore
Attys

UNITED STATES PATENT OFFICE.

EDWIN E. ARNOLD, OF DETROIT, MICHIGAN.

VEHICLE-AXLE.

1,035,404.  Specification of Letters Patent.  Patented Aug. 13, 1912.

Application filed May 4, 1912. Serial No. 695,052.

*To all whom it may concern:*

Be it known that I, EDWIN E. ARNOLD, a citizen of the United States of America, residing at Detroit, in the county of Wayne and State of Michigan, have invented certain new and useful Improvements in Vehicle-Axles, of which the following is a specification, reference being had therein to the accompanying drawings.

The invention relates to vehicle drive axle constructions of that type in which the drive connection between the wheel and the axle shaft is formed by the head or flange on the outside of the wheel hub. With such constructions it is usual to detachably bolt the driving head or flange to the wheel hub so as to permit the removal of the axle shaft without disturbing or loosening the wheel and hub assembly. The bolts which are employed for securing the driving flange to said hub are also utilized to secure the wheel hub assembly by passing through the hub flange, the intermediate spokes and an inner flange, usually the head of the brake drum, and clamping said parts rigidly together. Thus in order to accomplish this desirable feature a special construction of bolt or stud is required having an intermediate head or clamping collar and threaded opposite ends.

It is the object of the present invention to dispense with the use of a special bolt and to accomplish the dual and independent clamping of the hub assembly and driving flange construction.

It is a further object to obtain a stronger connection and particularly one which offers increased resistance to the shearing stresses on the bolt, due to the transmission of the driving torque from the axle to the wheel.

In the drawings,—Figure 1 is a central longitudinal section through a portion of the axle wheel and brake head; Fig. 2 is an elevation thereof.

A is the axle case of any suitable construction, B is the wheel journaled upon the end of the axle, C is the brake drum secured to the inner side of the wheel, D is the axle shaft within the casing A, and E is the torque head or driving flange which connects the shaft D with the wheel hub.

To secure the wheel hub assembly proper I employ an ordinary bolt F having a head G and a threaded end portion H. The head G is arranged on the inside of the wheel and engages the brake drum C.

I is a nut engaging the threaded portion H of the bolt F and bearing against the outer face of the hub flange K to clamp the hub assembly together. This nut I is preferably circular in section having a conical inner face J which fits a corresponding conical recess in the hub flange K of the wheel. The outer portion of the nut projects beyond the flange K and engages an aperture L in the head E. Thus the nut I in addition to its function of clamping the brake drum to the wheel, constitutes a reinforcement for the bolt F at the joint between the flange K and head E, increasing the cross section and thereby further resisting shearing stresses.

For detachably securing the driving head or flange E to the wheel a second nut M is arranged to engage the outer projecting end of the threaded portion H of the bolt, which nut bears against the flange of the head and clamps the same in position. Whenever it is desired to remove the shaft D the bolt M may be detached, permitting the withdrawal of the head E and without disturbing or loosening the connection between the brake drum and the wheel.

What I claim as my invention is:

1. The combination with a vehicle wheel having a brake drum at one side thereof and a torque head at the opposite side thereof, of a securing means for said parts comprising a bolt extending through the wheel and having a threaded outer end, a nut engaging the threaded portion of said bolt and clamping said brake drum, and a second nut engaging the outer end of said threaded portion and clamping said torque head.

2. The combination with a vehicle wheel, a brake drum arranged on one side thereof and a torque head on the opposite side, of a bolt forming a common clamping means for said head having a threaded portion at its outer end, a nut engaging the threaded portion of said bolt for clamping said brake drum, the outer portion of said nut extending into an alined aperture in said torque head and bridging the joint between said head and the wheel, and a second nut engaging the threaded portion of said bolt for clamping said torque head.

3. The combination with a vehicle wheel having a brake drum at one side thereof and a torque head on the opposite side, of a bolt having a headed inner end and a threaded outer end engaging the securing portion of said brake drum and extending through said wheel, a nut engaging the threaded portion of said bolt on the outer side of said wheel and having a clamping engagement therewith, said nut bridging the joint between said wheel and torque head, and a second nut engaging the outer end of said bolt and clamping said torque head.

4. The combination with a vehicle wheel having a metallic hub portion, of a brake drum and torque head arranged upon opposite sides of said wheel, a bolt having a threaded outer end and a headed inner end engaging said brake drum and passing outward through said metallic hub and torque head, a nut engaging the threaded portion of said bolt bridging the joint between said torque head and metallic hub and having a clamping bearing on the latter, and a second nut engaging the outer threaded portion of said bolt and clamping said torque head.

5. The combination with a vehicle wheel having a metallic hub, of a brake drum on the inner side of said wheel, a torque head upon the outer side of said wheel bearing against said metallic hub, said hub and torque head having registering apertures, a bolt passing through said wheel having a head at its inner end engaging said brake drum, and a threaded outer end passing through said registering apertures, a nut engaging the threaded portion of said bolt within said registering apertures and having a clamping bearing on the metallic hub, and a clamping nut upon the outer portion of said threaded bolt for securing the torque head.

6. The combination with a vehicle wheel having a metallic hub, of a brake drum on the inner side of said wheel and a torque head on the outer side of said wheel, the latter having a bearing against said metallic hub, a bolt passing through said wheel having a head at its inner end for engaging said brake drum, and a threaded outer end passing through registering apertures in said metallic hub and torque head, a nut engaging the threaded portion of said bolt having a tapering inner end forming a clamping engagement with said metallic hub, the outer portion of said nut bridging the joint between said hub and torque head, and a second nut for clamping said torque head to said hub.

In testimony whereof I affix my signature in presence of two witnesses.

EDWIN E. ARNOLD.

Witnesses:
JAMES P. BARRY,
DELBERT COLLINS.